3,062,661
METHOD OF MAKING MARSHMALLOW
Alexander J. Doumak, Los Angeles, Calif., assignor, by mesne assignments, to National Dairy Products Corporation, Chicago, Ill., a corporation of Delaware
No Drawing. Filed Oct. 31, 1960, Ser. No. 65,933
11 Claims. (Cl. 99—134)

This invention relates to a marshmallow product and to a method of making the same.

Heretofore in the manufacture of mashmallow products, and particularly in such manufacture by extrusion, it has been customary to first dissolve dry sugars including dextrose and sucrose in water, then heat to obtain solution, and finally to add corn syrup to cool the batch while obtaining incorporation of this ingredient.

It has heretofore been thought necessary to add dextrose in the first step above referred to, since sucrose alone as the dry sugar has such low solubility that difficulty has been experienced in putting sufficient thereof in solution without using amounts of water in excess of that consistent with proper practice of the remainder of the process. Efforts to remove such excess water have not proved satisfactory, owing in part to occurrence of caramelization.

I have discovered that if at least a part of the corn syrup is added at the beginning, some sucrose may be dissolved in water characteristic of the corn syrup itself, so that it is possible to use sucrose as the sole dry sugar introduced into the process, with considerable resultant economies in materials storage and handling, greatly facilitating continuous operation; and additionally that the new marshmallow product resulting has extremely good qualities of body, tenderness, and long shelf life. In general, the greater the fraction of the total corn syrup that is added initially, the better the quality of the marshmallow product.

First Example

In a presently preferred embodiment of the invention, I simultaneously begin introduction into a 250 gallon steam-jacketed stainless steel Groen kettle, with scraper blade agitation, of 100 pounds of water and 540 pounds of 54DE corn syrup (approximately 81.5% solids). Although introduction of the water is completed in three or four minutes, it requires about ten minutes to complete introduction of the corn syrup. I then add 75 pounds of amioca starch. I next optionally add any scrap for rework; in the amount for example of 75 to 100 pounds, though this addition may of course be omitted completely. I next introduce, over a five to ten minute period, 800 pounds of ordinary sugar (sucrose), and begin heating the kettle. I use steam at 80 pounds pressure in the steam jacket, heating until the agitated mixture reaches a temperature of 240° F. This requires about forty or forty-five minutes. I then cool the contents to about 185° F. by adding an additional 540 pounds of 54DE corn syrup (which is at a storage temperature of about 90 to 100 degrees F.), and immediately thereafter transfer the contents of the Groen kettle to a cooling tank.

The cooling tank is a 250 gallon stainless steel water-cooled tank equipped with an agitator of the Lightning mixer type. The water-syrup-starch-sugar mixture is first cooled to 150° F., so as not to adversely affect the gelatin to be added. Thereafter, a solution of 50 pounds of gelatin (which is preferably a special marshmallow gelatin of the type commercially designated as 225 bloom, such as Swift's Superwhip or Gray's Lake Mallobase) in 100 pounds of water is introduced into the cooling tank. (This gelatin-water mixture is prepared in a 25 gallon stainless steel tank with a Lightning type mixer; water is added at 160° F., but the gelatin cools it so that the mixture has a temperature of 145–150° F. The mixture in the cooling tank is next cooled to 130° F. Any desired flavoring or coloring material is next added, after which the mixture is pumped from the cooling tank to a holding (or surge) tank.

From the holding tank, the mixture is pumped at the rate of 3½ gallons per minute by a high pressure gear pump (preferably a Viking pump of the gear-within-a-gear type) at 350 p.s.i. through, successively, an Oakes Beater, a Votator, and extruding nozzles, compressed air being introduced at the entrance to the Oakes Beater. The Oakes Beater is of the type well known in the art, and its varispeed drive is operated at maximum r.p.m. to maximize air incorporation and minimize air bubble size. The Votator is of the three-tube type well known in the art, and the mixture is passed through the three tubes in series, for cooling (to about 112° F.) and further homogenizing of the beaten mixture. A back pressure valve of suitable construction, such as that manufactured by Cherry-Burrell, is interposed between the Oakes Beater and the Votator, in order to maintain the desired pressure of 350 p.s.i. already referred to. Compressed air is introduced as indicated, at 450 p.s.i., and in amount sufficient to produce a product having a density of 42 ounces per gallon.

The extruded material may suitably be dusted with a starch-sugar mixture, cut off, further dusted with starch-sugar mixture, and cooled to form finished marshmallows.

Second Example

In a second preferred embodiment of the invention, the same processing steps, equipment, ingredients, quantities and pressures, and substantially the same temperatures, were used. However, all the corn syrup, 1080 pounds, was added initially, introduction beginning simultaneously with introduction of the water. An exceptionally stable product, with unusual shelf life and resistance to drying out, resulted.

Third Example

In a third successful embodiment of the invention, the same processing steps, ingredients, and equipment were used. In this embodiment, however, 480 pounds of 54DE corn syrup were added initially, in the manner previously described, and an additional 480 pounds were added following solution of the sucrose (which was added in the amount of 930 pounds). The cooling tank was cooled to 155° F. prior to adding the gelatin-water mixture. Back pressure through the Oakes Beater was maintained at 300 p.s.i. Otherwise, quantities, temperatures, and pressures were as described in the preceding examples.

Fourth Example

In a fourth successful embodiment, the same processing steps, ingredients, and equipment were again used; and temperatures and pressures were as set forth in the Third Example. However, in this embodiment, all the corn syrup was (as in the Second Example) added initially; and the quantities of water, corn syrup, and sucrose used were respectively 84, 1020, and 900 pounds.

Other embodiments within the scope of the appended claims will occur to those skilled in the art, in the light of the foregoing disclosure.

I claim:

1. A method of making and extruding marshmallow product which comprises the step of dissolving sugar consisting of sucrose in corn syrup.

2. The method of claim 1 in which said corn syrup is diluted with extraneous water.

3. The method of making and extruding marshmallow product which comprises the steps of adding at least a portion of the corn syrup to be incorporated in said product to a heatable container, thereafter adding to said container sugar consisting of sucrose to be incorporated in said product, and heating the said container.

4. The method of claim 3 in which half the corn syrup to be incorporated in said product is added to said container prior to adding said sucrose.

5. The method of claim 3 in which all said corn syrup to be incorporated in said product is added to said container prior to adding said sucrose.

6. The method of making and extruding marshmallow product which comprises dissolving sugar consisting of 800 pounds of sucrose in a mixture of 100 pounds of water and 540 pounds of 54DE corn syrup, and thereafter adding thereto an additional 540 pounds of 54DE corn syrup at storage temperature.

7. The method of making and extruding marshmallow product which comprises dissolving sugar consisting of 800 pounds of sucrose in a mixture of 100 pounds of water and 1080 pounds of 54DE corn syrup.

8. The method of making and extruding marshmallow product which comprises dissolving sugar consisting of 930 pounds of sucrose in a mixture of 100 pounds of water and 480 pounds of 54DE corn syrup, and thereafter adding thereto an additional 480 pounds of 54DE corn syrup at storage temperature.

9. The method of making and extruding marshmallow product which comprises dissolving sugar consisting of 900 pounds of sucrose in a mixture of 84 pounds of water and 1020 pounds of 54DE corn syrup.

10. The method of making and extruding marshmallow product which comprises the step of dissolving sugar consisting of from 800 to 930 parts by weight of sucrose in a mixture of from 84 to 100 parts by weight of water and 480 to 1080 parts by weight of corn syrup.

11. The method of claim 3 which includes the step of extruding said marshmallow product through at least one extruding nozzle.

References Cited in the file of this patent

UNITED STATES PATENTS 2,847,311     Doumak et al. _____ Aug. 12, 1958

OTHER REFERENCES

"Candy Production: Methods and Formulas," by Richmond, The Manufacturing Confectioner, Chicago, Illinois, 1948, pages 349, 351, 352, 355, 356 and 360.